United States Patent
Klaass et al.

(10) Patent No.: US 6,881,027 B2
(45) Date of Patent: Apr. 19, 2005

(54) GEARLESS/OILLESS GAS TURBINE ENGINE

(75) Inventors: Reinhard M. Klaass, Orem, UT (US); Donald I. Takeuchi, Tempe, AZ (US); Bjoern Schenk, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 18 days.

(21) Appl. No.: 10/631,946

(22) Filed: Jul. 30, 2003

(65) Prior Publication Data

US 2004/0161333 A1 Aug. 19, 2004

Related U.S. Application Data

(60) Provisional application No. 60/448,694, filed on Feb. 18, 2003.

(51) Int. Cl.⁷ ............................................... F01D 25/16
(52) U.S. Cl. ........................ 415/104; 415/229; 415/230
(58) Field of Search ................................. 415/111, 112, 415/113, 229, 230, 104; 277/400

(56) References Cited

U.S. PATENT DOCUMENTS

| | | | |
|---|---|---|---|
| 4,082,296 A | * | 4/1978 | Stein ........................... 277/400 |
| 4,406,466 A | * | 9/1983 | Geary, Jr. .................... 277/400 |
| 4,725,206 A | * | 2/1988 | Glaser et al. ................ 417/407 |
| 5,174,584 A | * | 12/1992 | Lahrman .................... 277/400 |
| 5,749,700 A | | 5/1998 | Henry et al. |
| 5,799,484 A | | 9/1998 | Nims |
| 5,893,517 A | | 4/1999 | Delamare |
| 6,057,619 A | | 5/2000 | Domberg et al. |
| 6,170,251 B1 | | 1/2001 | Skowronski et al. |
| 6,198,174 B1 | | 3/2001 | Nims et al. |
| 6,232,688 B1 | | 5/2001 | Ress, Jr. et al. |
| 6,246,138 B1 | | 6/2001 | Nims |
| 6,249,070 B1 | | 6/2001 | Sharp |
| 6,276,124 B1 | | 8/2001 | Soh et al. |
| 6,286,303 B1 | | 9/2001 | Pfligler et al. |
| 6,294,842 B1 | | 9/2001 | Skowronski |
| 6,307,278 B1 | | 10/2001 | Nims et al. |
| 6,367,241 B1 | | 4/2002 | Ress, Jr. et al. |
| 6,378,293 B1 | | 4/2002 | Care et al. |
| 6,455,964 B1 | | 9/2002 | Nims |
| 6,524,005 B1 | | 2/2003 | Bridges |

OTHER PUBLICATIONS

R. Nims, Development of an Oilless, Gearless and Bleedable Under Armor Auxiliary Unit, ASME 95-GT-444, 12 pgs, Jun. 1995.

\* cited by examiner

*Primary Examiner*—Ninh H. Nguyen
(74) *Attorney, Agent, or Firm*—Robert Desmond, Esq.

(57) ABSTRACT

The complex mechanical gear trains and lubrication systems of conventional engine configurations are eliminated by using combinations of hydrodynamic air foil bearings, hydrodynamic solid geometry carbon seals/bearings, magnetic bearings, and electrical starter/generators that can also act as bearings to support the high speed shafts of gas turbine engines. The various bearing types and the starter/generators are arranged in such a way as to share peak loads experienced by the engine shaft during maximum aircraft maneuvers. This results in a minimal bearing and engine size.

29 Claims, 2 Drawing Sheets

GEARLESS/OILLESS GAS TURBINE ENGINE

CROSS-REFERENCE TO RELATED APPLICATION

This application claims the benefit of U.S. Provisional application, Ser. No. 60/448,694, filed Feb. 18, 2003.

BACKGROUND OF THE INVENTION

The present invention generally relates a gearless and oilless gas turbine engine, and, more specifically, to gearless and oilless rotors supported by several non-contact bearings used in combination with each other.

Conventional aircraft gas turbine engines use a complex oil lubrication system to lubricate rolling element bearings supporting the high speed shafting. Controls and accessories that support critical engine operation, such as the fuel and lubrication systems, cannot operate at the high shaft speeds and, therefore, must be geared down using complex mechanical gear trains. These conventional engine configurations are complex and result in high initial as well as high operational costs.

U.S. Pat. No. 6,367,241 concerns a pressure-assisted electromagnetic thrust bearing. The pressure-assisted electromagnetic thrust bearing is a hydrostatic bearing using compressor discharge air. The air is hot and, although some cooling may take place in the tube 70, the air increases the magnetic bearing operating temperatures, reducing its life and reliability. The compressor air is piped into air chambers 90 and, due to seal leakage, some of this compressed air may result in a loss to the engine thermodynamic performance. The pressure at altitude will be lower, thus reducing the thrust load reaction capability in the pressure-assisted fluid bearing (FIG. 2 of U.S. Pat. No. 6,367,241).

As can be seen, there is a need for a gas turbine engine having bearings that are simple in design, relatively small in size, and light in weight. Moreover, such a gas turbine engine should have bearings that adequately support the engine's rotors during both regular engine operations and during the various loads that are applied during aircraft flight maneuvers.

SUMMARY OF THE INVENTION

In one aspect of the present invention, a rotor comprises at least a first rotor; an air foil bearing supporting a first end of the first rotor; and a hydrodynamic carbon bearing/seal providing additional support to the first rotor and sealing a bearing compartment of the air foil bearing, thereby allowing an increased internal operating pressure, and hence, increased capacity, as compared to the air foil bearing without the hydrodynamic carbon bearing/seal.

In another aspect of the present invention, a rotor having its load shared among a plurality of bearings comprises a first rotor; an air foil bearing supporting a first end of the first rotor; a hydrodynamic carbon bearing/seal providing additional support to the first rotor and sealing a bearing compartment of the air foil bearing, thereby allowing an increased internal operating pressure, and hence, increased capacity, as compared to the air foil bearing without the hydrodynamic carbon bearing/seal; the hydrodynamic carbon bearing/seal being designed integrally with the air foil bearing; an electrical machine having an electrical machine bearing therein; the electrical machine bearing supporting a second, opposite end of the first rotor; the electrical machine bearing includes an electrical machine air foil bearing and an electrical machine hydrodynamic carbon bearing/seal providing additional support to the first rotor and sealing a bearing compartment of the electrical machine air foil bearing, thereby allowing an increased internal operating pressure, and hence, increased capacity, as compared to the electrical machine air foil bearing without the electrical machine hydrodynamic carbon bearing/seal; and the electrical machine hydrodynamic carbon bearing/seal being designed integrally with the electrical machine air foil bearing.

In yet another aspect of the present invention, a rotor for a two spool engine configuration of an aircraft, comprises a first rotor; a second rotor; an air foil bearing supporting a first end of the first rotor; a second air foil bearing supporting a first end of the second rotor; a first hydrodynamic carbon bearing/seal providing additional support to the first rotor and sealing a bearing compartment of the air foil bearing, thereby allowing an increased internal operating pressure, and hence, increased capacity, as compared to the air foil bearing without the hydrodynamic carbon bearing/seal; a second hydrodynamic carbon bearing/seal providing additional support to the second rotor and sealing a bearing compartment of the second air foil bearing, thereby allowing an increased internal operating pressure, and hence, increased capacity, as compared to the second air foil bearing without the second hydrodynamic carbon bearing/seal; the first hydrodynamic carbon bearing/seal and the second hydrodynamic carbon bearing/seal being designed integrally with the air foil bearing; a first electrical machine having an electrical machine bearing therein, the second electrical machine bearing supporting a second, opposite end of the first rotor; a second electrical machine having an electrical machine bearing therein, the second electrical machine bearing supporting a second, opposite end of the second rotor; the first and second electrical machine bearings each include an electrical machine air foil bearing and an electrical machine hydrodynamic carbon bearing/seal providing additional support to the first and second rotor and sealing a bearing compartment of the first and second electrical machine air foil bearing, thereby allowing an increased internal operating pressure, and hence, increased capacity, as compared to the first and second electrical machine air foil bearing without the first and second electrical machine hydrodynamic carbon bearing/seal; and the first and second electrical machine hydrodynamic carbon bearing/seals being designed integrally with the first and second electrical machine air foil bearings.

In a further aspect of the present invention, a method for sharing the load of a rotor of an aircraft gas turbine engine, comprises supporting a first end of a first rotor by a first air foil bearing; sealing a bearing compartment of the first air foil bearing with a first hydrodynamic carbon bearing/seal, the first hydrodynamic carbon bearing/seal providing additional support for the first rotor; and supporting a second, opposite end of the first rotor by a first electrical machine bearing from a first electrical machine, the first electrical machine bearing includes a first electrical machine air foil bearing and a first electrical machine hydrodynamic carbon bearing/seal providing additional support to the first rotor and sealing a bearing compartment of the first electrical machine air foil bearing.

In still a further aspect of the present invention, a hydrodynamic carbon bearing/seal comprises a circular U-shaped substrate; a plurality of carbon segments arranged circumferentially in the substrate; an axial preload spring providing a resilient force on each of the plurality of carbon segments in an axial direction; a radial spring providing a resilient force on each of the plurality of carbon segments in a radial direction, pressing the plurality of carbon segments into contact with the first rotor when the rotor is in a non-operational state; and a rotor contacting face of each of the plurality of carbon segments designed to create a force opposite that of the radial spring when the first rotor is rotated, thereby creating the hydrodynamic carbon bearing/seal.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention.

The present invention eliminates both the complex mechanical gear trains and lubrication systems of the conventional engine configurations by using combinations of hydrodynamic air foil bearings, hydrodynamic solid geometry carbon seals/bearings, magnetic bearings, and electrical starter/generators that can also act as bearings to support the high speed shafts of gas turbine engines. The various bearing types and the starter/generators are arranged in such a way as to share peak loads experienced by the engine shaft during maximum aircraft maneuvers. This results in a smaller bearing and engine size.

The present invention may use non-contact bearings including air foil, magnetic, and hydrodynamic carbon bearings. In addition, any electrical machines integral with the shaft may be used as a bearing to support the shaft. Through proper load sharing, an adequate support may be obtained for the shaft via the various combinations of these bearings and electric machines.

In one embodiment of the present invention, air foil bearings carry a majority of the radial load. Carbon hydrodynamic bearings share the load and react peak aircraft maneuver loads. Electric starters and/or generators may add additional peak load sharing capabilities. Axial thrust loads may be reacted by magnetic bearings plus hydrodynamic carbon bearings. Electric machines, in particular, axial gap machines, may also be configured to react thrust load.

Figure 1:
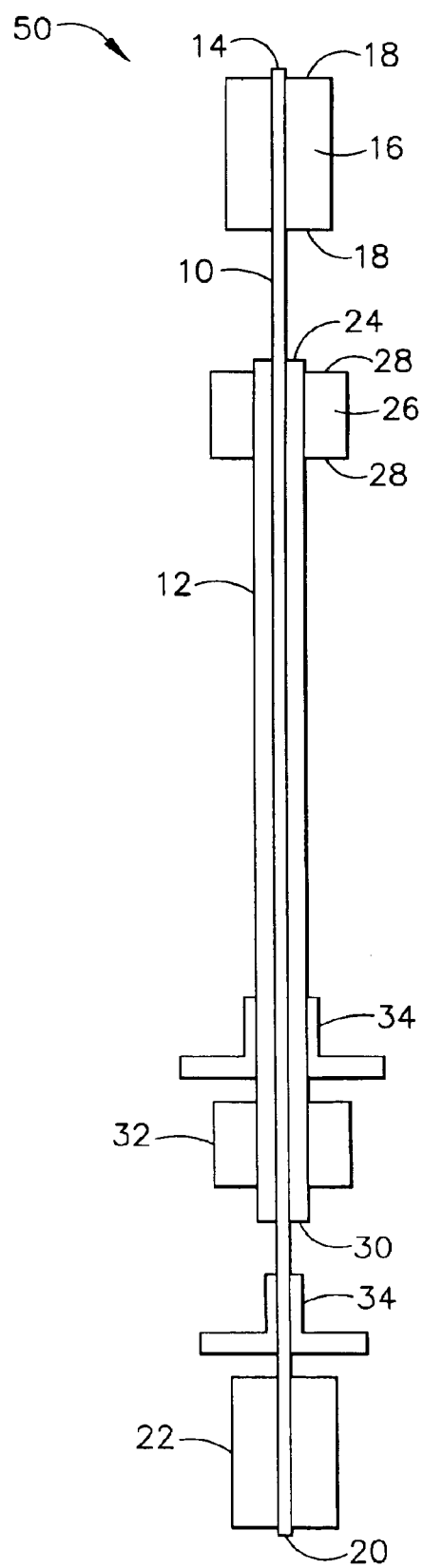
FIG. 1 is a schematic diagram showing a shaft/bearing configuration according to the present invention.

Referring to FIG. 1, there is shown a schematic diagram showing a shaft/bearing configuration according to the present invention. A low pressure rotor 10 and a high pressure rotor 12 are part of a two spool engine configuration 50. A first end 14 of low pressure rotor 10 may be supported by a combination of an air foil bearing 16 with a carbon hydrodynamic bearing/seal 18. Carbon hydrodynamic bearing/seal 18 is provided next to air foil bearing 16 to seal the bearing compartment of air foil bearing, thereby increasing the pressure, and hence, load capacity of air foil bearing 16. This allows for the use of a small bearing size while maintaining bearing effectiveness. Air foil bearing 16 may be made of a material that allows operation in temperatures up to 1500° F.

A second end 20 of low pressure rotor 10 may be supported by a generator 22. In one embodiment of the present invention, generator 22 contains a combination of an air foil bearing 16 and carbon hydrodynamic bearing/seal 18, as described as being present at first end 14 of low pressure rotor 10. The bearings in generator 22 may provide support for both axial (thrust) and radial loads on rotor 10.

A first end 24 of high pressure rotor 12 may be supported by a combination of an air foil bearing 26 with carbon hydrodynamic bearing/seal 28. Carbon hydrodynamic bearing/seal 28 is provided next to air foil bearing 26 to seal the bearing compartment of air foil bearing 26, thereby increasing the pressure, and hence, load capacity of air foil bearing 26. This allows for the use of a small bearing size while maintaining bearing effectiveness. Air foil bearing 26 may be made of a material that allows operation in temperatures up to 1500° F.

A second end 30 of high pressure rotor 12 may be supported by a starter/generator 32. In one embodiment of the present invention, starter/generator 32 contains a combination of an air foil bearing 26 and carbon hydrodynamic bearing/seal 28, as described as being present at first end 24 of high pressure rotor 12. The bearings in starter/generator 32 may provide support for both axial (thrust) and radial loads on rotor 12.

Thrust bearings 34 may be provided on both high pressure rotor 12 and low pressure rotor 10. Thrust bearings 34 may be a combination of a magnetic bearing having a carbon hydrodynamic bearing/seal. As with the air foil bearings described above, the use of the carbon hydrodynamic bearing/seals on thrust bearings 34 result in the need for smaller thrust bearings 34 on each of high pressure rotor 12 and low pressure rotor 10.

While the above invention has been described using two carbon hydrodynamic bearing/seals, one on each end of the air foil bearings, the invention is not meant to be as limited. For example, only one carbon hydrodynamic bearing/seal may be present on each air foil bearing.

Figure 2:
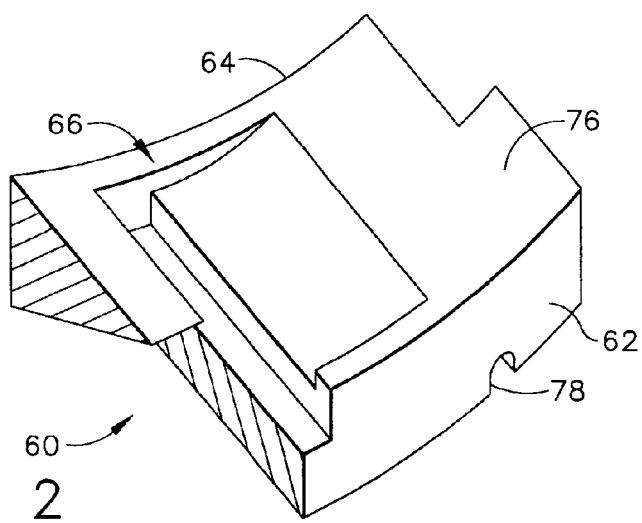
FIG. 2 is a perspective view of a carbon segment of a carbon bearing according to an embodiment of the present invention.
Figure 3:
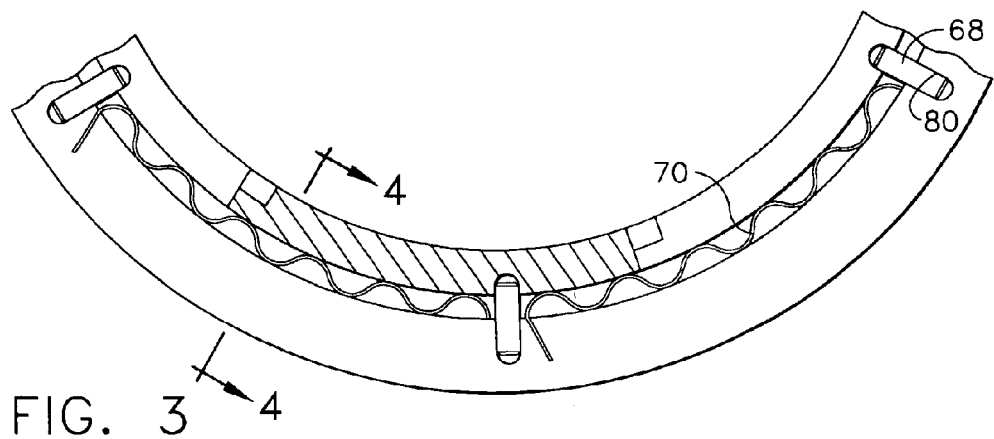
FIG. 3 is a partial axial view of a segmented carbon bearing according to an embodiment of the present invention.
Figure 4:
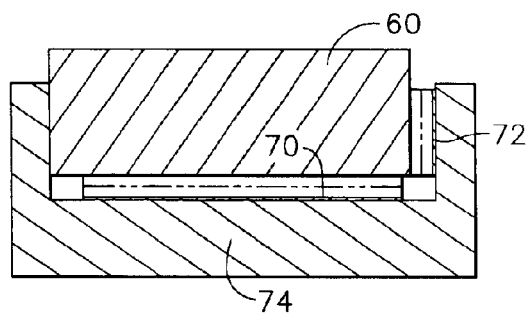
FIG. 4 is a cross-sectional circumferential view of the segmented carbon bearing of FIG. 3.

Referring now to FIGS. 2–4, there are shown drawings depicting the segmented carbon bearing used as the carbon hydrodynamic bearing/seal of the present invention.

The carbon hydrodynamic bearing/seal may be made up of several carbon bearing segments 60 arranged circumferentially in a substrate 74. Substrate 74 may be substantially U shaped, containing carbon bearing segments 60 therein. An axial preload spring 72 may provide a resilient force on carbon bearing segment 60 in an axial direction. A radial spring 70 may provide a resilient force on carbon bearing segment 60 in a radial direction. Radial spring 70 may press carbon bearing segments 60 into contact with rotor (not shown) when the system is in a non-operational state (i.e., the rotor is not rotating).

During operation (i.e., rotation of the rotor), a rotor contacting face 76 of carbon bearing segment 60 is designed to create a radial centrifugally-directed force opposite to the force exerted by radial spring 70. The result of this radial force is that the rotor may rotate in the carbon hydrodynamic bearing/seal without contacting the surface of the bearing. This design is also relevant in that it allows for small movements of the rotor during operation. Furthermore, the carbon hydrodynamic bearing/seal may be made out of a high fidelity carbon material that allows short periods of contact between the rotor and the carbon hydrodynamic bearing/seal during aircraft maneuver loads.

Carbon bearing segments 60 may be provided with a notch 78. Furthermore, substrate 74 may have corresponding notches 80 therein. Anti-rotation pins 68, which fit into notches 78 and 80, may be provided to prevent rotation of carbon bearing segments without the corresponding rotation of substrate 74.

Carbon bearing segments 60 may have a high pressure side 62 and a low pressure side 64. High pressure side 62 may provide the sealing function when used in conjunction with the air foil bearings or the magnetic bearings as described above. A sealing dam 66 may be machined into each carbon bearing segment 60. Sealing dam 66 is made of a predetermined size and shape depending on the sealing requirements of the carbon hydrodynamic bearing/seal. For example, sealing dam 66 may be configured to allow air to pass through at a certain pressure level, thereby regulating the pressure within the air foil bearing.

The present invention may result in a substantially reduced bearing size and weight, by combining the air foil bearings with a carbon hydrodynamic bearing/seal. Moreover, the carbon hydrodynamic bearing/seal provides a seal against the air foil bearings, thereby allowing a higher pressure within the air foil bearing and thus allowing the bearing to be made smaller. Finally, the electrical machines, such as the generator and starter, may be designed to act as bearings. The carbon hydrodynamic bearing/seal may also be made integrally with the electrical machines, or may be a separate component, sealing the electrical machine's internal bearing from a position external to the electrical machine. By using such a bearing design, not only may smaller bearings be used, but a shorter rotor length may also be obtained, resulting is smaller size and lighter weight.

It should be understood, of course, that the foregoing relates to preferred embodiments of the invention and that modifications may be made without departing from the spirit and scope of the invention.

We claim:

1. A rotor comprising:
   at least a first rotor;
   an air foil bearing supporting a first end of said first rotor; and
   a hydrodynamic carbon bearing/seal providing additional support to said first rotor and sealing a bearing compartment of said air foil bearing, thereby allowing an increased internal operating pressure of said air foil bearing, and hence, increased load capacity of said air foil bearing, as compared to said air foil bearing without said hydrodynamic carbon bearing/seal.

2. The rotor according to claim 1, wherein said hydrodynamic carbon bearing/seal is designed integrally with said air foil bearing.

3. A rotor comprising:
   at least a first rotor;
   an air foil bearing supporting a first end of said first rotor;
   a hydrodynamic carbon bearing/seal providing additional support to said first rotor and sealing a bearing compartment of said air foil bearing, thereby allowing an increased internal operating pressure, and hence, increased capacity, as compared to said air foil bearing without said hydrodynamic carbon bearing/seal, wherein said hydrodynamic carbon bearing/seal is designed integrally with said air foil bearing;
   an electrical machine having an electrical machine bearing therein reacting either a thrust load or radial load or both; and
   said electrical machine bearing supporting a second, opposite end of said first rotor.

4. The rotor according to claim 3, wherein said electrical machine bearing includes an electrical machine air foil bearing and an electrical machine hydrodynamic carbon bearing/seal providing additional axial and radial support to said first rotor and sealing a bearing compartment of said electrical machine air foil bearing, thereby allowing an increased internal operating pressure, and hence, increased capacity, as compared to said electrical machine air foil bearing without said electrical machine hydrodynamic carbon bearing/seal.

5. The rotor according to claim 3, wherein said electrical machine is an axial gap electric machine.

6. The rotor according to claim 4, wherein said electrical machine hydrodynamic carbon bearing/seal is designed integrally with said electrical machine air foil bearing.

7. The rotor according to claim 3 wherein said at least a first rotor includes a first rotor and a second rotor further comprising:
   a second air foil bearing supporting a first end of said second rotor; and
   a second hydrodynamic carbon bearing/seal providing additional support to said second rotor and sealing a bearing compartment of said second air foil bearing, Thereby allowing an increased internal operating pressure, and hence, increased capacity, as compared to said second air foil bearing without said second hydrodynamic carbon bearing/seal.

8. The rotor according to claim 7, wherein said second hydrodynamic seal is designed integrally with said second air foil bearing.

9. The rotor according to claim 8, further comprising:
   a second electrical machine having a second electrical machine bearing therein reacting either a thrust load (an axial gap electrical machine) or radial load or both; and
   said second electrical machine bearing supporting a second, opposite end of said second rotor.

10. The rotor according to claim 9, wherein said second electrical machine bearing includes a second electrical machine air foil bearing and a second electrical machine hydrodynamic carbon bearing/seal providing additional axial and radial support to said first rotor and sealing a bearing compartment of said second electrical machine air foil bearing, thereby allowing an increased internal operating pressure, and hence, increased capacity, as compared to said second electrical machine air foil bearing without said second electrical machine hydrodynamic carbon bearing/seal.

11. The rotor according to claim 10, wherein said second electrical machine hydrodynamic carbon bearing/seal is designed integrally with said second electrical machine air foil bearing.

12. The rotor according to claim 9, wherein said second electrical machine is a starter.

13. The rotor according to claim 7, further comprising:
   a second magnetic thrust bearing supporting said second rotor; and
   a second thrust bearing hydrodynamic carbon bearing/seal sealing said second magnetic thrust bearing and providing additional support of said second rotor.

14. The rotor according to claim 3, further comprising:
   a magnetic thrust bearing supporting said first rotor; and a thrust bearing hydrodynamic carbon bearing/seal sealing said magnetic thrust bearing and providing additional support of said first rotor.

15. The rotor according to claim 3, wherein said electrical machine is a combination starter/generator in a single spool engine configuration or a generator when said first rotor is a low pressure rotor for a two spool engine configuration.

16. The rotor according to claim 3, wherein said hydrodynamic carbon bearing/seal comprises:

a circular U-shaped substrate;

a plurality of carbon segments arranged circumferentially in said substrate;

an axial preload spring providing a resilient force on each of said plurality of carbon segments in an axial direction;

a radial spring providing a resilient force on each of said plurality of carbon segments in a radial direction, pressing said plurality of carbon segments into contact with said first rotor when said rotor is in a non-operational state; and a rotor contacting face of each of said plurality of carbon segments designed to create a force opposite that of said radial spring when said first rotor is rotated, thereby creating said hydrodynamic carbon bearing/seal.

17. A rotor having its load shared among a plurality of bearings comprising:

a first rotor;

an air foil bearing supporting a first end of said first rotor;

a hydrodynamic carbon bearing/seal providing additional support to said first rotor and sealing a bearing compartment of said air foil bearing, thereby allowing an increased internal operating pressure, and hence, increased capacity, as compared to said air foil bearing without said hydrodynamic carbon bearing/seal;

said hydrodynamic carbon bearing/seal being designed integrally with said air foil bearing;

an electrical machine having an electrical machine bearing therein;

said electrical machine bearing supporting a second, opposite end of said first rotor;

said electrical machine bearing includes an electrical machine air foil bearing and an electrical machine hydrodynamic carbon bearing/seal providing additional axial and radial support to said first rotor and sealing a bearing compartment of said electrical machine air foil bearing, thereby allowing an increased internal operating pressure, and hence, increased capacity, as compared to said electrical machine air foil bearing without said electrical machine hydrodynamic carbon bearing/seal; and said electrical machine hydrodynamic carbon bearing/seal being designed integrally with said electrical machine air foil bearing.

18. The rotor according to claim 17, further comprising:

a second rotor;

a second air foil bearing supporting a first end of said second rotor; and a second hydrodynamic carbon bearing/seal providing additional support to said second rotor and sealing a bearing compartment of said second air foil bearing, thereby allowing an increased internal operating pressure, and hence, increased capacity, as compared to said second air foil bearing without said second hydrodynamic carbon bearing/seal; wherein said second hydrodynamic seal is designed integrally with said second air foil bearing.

19. The rotor according to claim 18, further comprising:

a second electrical machine having a second electrical machine bearing therein; wherein said second electrical machine bearing supporting a second, opposite end of said second rotor;

said second electrical machine bearing includes a second electrical machine air foil bearing and a second electrical machine hydrodynamic carbon bearing/seal providing additional axial and radial support to said first rotor and sealing a bearing compartment of said second electrical machine air foil bearing, thereby allowing an increased internal operating pressure, and hence, increased capacity, as compared to said second electrical machine air foil bearing without said second electrical machine hydrodynamic carbon bearing/seal; and said second electrical machine hydrodynamic carbon bearing/seal is designed integrally with said second electrical machine air foil bearing.

20. The rotor according to claim 19, further comprising:

a magnetic thrust bearing supporting said first rotor; and a thrust bearing hydrodynamic carbon bearing/seal sealing said magnetic thrust bearing and providing additional support of said first rotor.

21. The rotor according to claim 20, further comprising:

a second magnetic thrust bearing supporting said second rotor; and a second thrust bearing hydrodynamic carbon bearing/seal sealing said second magnetic thrust bearing and providing additional support of said second rotor.

22. A rotor for a two spool engine configuration of an aircraft, comprising:

a first rotor;

a second rotor;

an air foil bearing supporting a first end of said first rotor;

a second air foil bearing supporting a first end of said second rotor;

a first hydrodynamic carbon bearing/seal providing additional support to said first rotor and sealing a bearing compartment of said air foil bearing, thereby allowing an increased internal operating pressure, and hence, increased capacity, as compared to said air foil bearing without said hydrodynamic carbon bearing/seal;

a second hydrodynamic carbon bearing/seal providing additional support to said second rotor and sealing a bearing compartment of said second air foil bearing, thereby allowing an increased internal operating pressure, and hence, increased capacity, as compared to said second air foil bearing without said second hydrodynamic carbon bearing/seal;

said first hydrodynamic carbon bearing/seal arid said second hydrodynamic carbon bearing/seal being designed integrally with said air foil bearing;

a first electrical machine having an electrical machine bearing therein, said second electrical machine bearing supporting a second, opposite end of said first rotor;

a second electrical machine having an electrical machine bearing therein, said second electrical machine bearing supporting a second, opposite end of said second rotor;

said first and second electrical machine bearings each include an electrical machine air foil bearing and an electrical machine hydrodynamic carbon bearing/seal providing additional axial and radial support to said first and second rotor and sealing a bearing compartment of said first and second electrical machine air foil bearing, thereby allowing an increased internal operating pressure, and hence, increased capacity, as compared to said first and second electrical machine air foil bearing without said first and second electrical machine hydrodynamic carbon bearing/seal; and said first and second electrical machine hydrodynamic carbon bearing/seals being designed integrally with said first and second electrical machine air foil bearings.

23. The rotor according to claim 22, further comprising:

a first magnetic thrust bearing supporting said first rotor;

a second magnetic thrust bearing supporting said second rotor;

a first thrust bearing hydrodynamic carbon bearing/seal sealing said first magnetic thrust bearing and providing additional support of said first rotor; and a second thrust bearing hydrodynamic carbon bearing/seal sealing said second magnetic thrust bearing and providing additional support of said second rotor.

24. The rotor according to claim 22, wherein:

said first electrical machine is a generator; and said second electrical machine is a starter.

25. The rotor according to claim 22, wherein each of said hydrodynamic carbon bearing/seal comprises:

a circular U-shaped substrate;

a plurality of carbon segments arranged circumferentially in said substrate;

an axial preload spring providing a resilient force on each of said plurality of carbon segments in an axial direction;

a radial spring providing a resilient force on each of said plurality of carbon segments in a radial direction, pressing said plurality of carbon segments into contact with said first rotor when said rotor is in a non-operational state; and a rotor contacting face of each of said plurality of carbon segments designed to create a force opposite that of said radial spring when said first rotor is rotated, thereby creating said hydrodynamic carbon bearing/seal.

26. A method for sharing the load of a rotor of an aircraft gas turbine engine, comprising:

supporting a first end of a first rotor by a first air foil bearing;

sealing a bearing compartment of said first air foil bearing with a first hydrodynamic carbon bearing/seal, said first hydrodynamic carbon bearing/seal providing additional support for said first rotor; and supporting a second, opposite end of said first rotor by a first electrical machine bearing from a first electrical machine, said first electrical machine bearing includes a first electrical machine air foil bearing and a first electrical machine hydrodynamic carbon bearing/seal providing additional support to said first rotor and sealing a bearing compartment of said first electrical machine air foil bearing.

27. The method according to claim 26, further comprising:

supporting a first end of a second rotor by a second air foil bearing;

sealing a bearing compartment of said second air foil bearing with a second hydrodynamic carbon bearing/seal, said second hydrodynamic carbon bearing/seal providing additional support for said second rotor; and supporting a second, opposite end of said second rotor by a second electrical machine bearing from a second electrical machine, said second electrical machine bearing includes a second electrical machine air foil bearing and a second electrical machine hydrodynamic carbon bearing/seal providing additional support to said second rotor and sealing a bearing compartment of said second electrical machine air foil bearing.

28. The method according to claim 27, further comprising:

supporting said first rotor with a first magnetic thrust bearing;

supporting said second rotor with a second magnetic thrust bearing;

sealing said first magnetic thrust bearing with a first thrust bearing hydrodynamic carbon bearing/seal, thereby providing additional support of said first rotor; and sealing said second magnetic thrust bearing with a second thrust bearing hydrodynamic carbon bearing/seal, thereby providing additional support of said second rotor.

29. A rotor comprising:

at least a first rotor;

an air foil bearing supporting a first end of said first rotor;

a hydrodynamic carbon bearing/seal providing additional support to said first rotor and sealing a bearing compartment of said air foil bearing, thereby allowing an increased internal operating pressure of said air foil bearing, and hence, increased load capacity of said air foil bearing, as compared to said air foil bearing without said hydrodynamic carbon bearing/seal;

a magnetic thrust bearing supporting said first rotor; and a thrust bearing hydrodynamic carbon bearing/seal sealing said magnetic thrust bearing and providing additional support of said first rotor.

* * * * *